United States Patent
Primdahl et al.

(10) Patent No.: US 6,908,571 B2
(45) Date of Patent: *Jun. 21, 2005

(54) PROCESS AND REACTOR FOR THE PREPARATION OF HYDROGEN AND CARBON MONOXIDE RICH GAS

(75) Inventors: Ivar Ivarsen Primdahl, Copenhagen (DK); Thomas Sandahl Christensen, Lyngby (DK)

(73) Assignee: Haldor Topsoe A/S, Lyngby (DK)

( * ) Notice: Subject to any disclaimer, the term of this patent is extended or adjusted under 35 U.S.C. 154(b) by 80 days.

This patent is subject to a terminal disclaimer.

(21) Appl. No.: 10/457,470

(22) Filed: Jun. 10, 2003

(65) Prior Publication Data

US 2003/0219374 A1 Nov. 27, 2003

Related U.S. Application Data

(63) Continuation of application No. 09/752,728, filed on Jan. 3, 2001, now abandoned.
(60) Provisional application No. 60/175,427, filed on Jan. 11, 2000.

(51) Int. Cl.$^7$ ............................... C10J 3/00; B01J 8/00; C01B 31/18; C01B 3/26

(52) U.S. Cl. ................. 252/373; 423/245.3; 423/418.2; 423/650; 423/651
(58) Field of Search ....................... 252/373; 423/245.3, 423/418.2, 650, 651

(56) References Cited

U.S. PATENT DOCUMENTS

| | | |
|---|---|---|
| 5,492,649 A | 2/1996 | Christensen |
| 5,628,931 A | 5/1997 | Lednor et al. |
| 5,958,297 A | 9/1999 | Primdahl |

FOREIGN PATENT DOCUMENTS

| | | |
|---|---|---|
| GB | 1 484 593 A | 9/1977 |

*Primary Examiner*—Stanley S. Silverman
*Assistant Examiner*—Jonas N. Strickland
(74) *Attorney, Agent, or Firm*—Dickstein Shapiro Morin & Oshinsky, LLP

(57) ABSTRACT

Soot formation is suppressed in the preparation of hydrogen and/or carbon monoxide rich gas by arranging on at least a surface of an upper portion of a reactor a catalytic material which is active in steam reforming hydrocarbons, introducing a hydrocarbon feedstock and an oxygen-containing atmosphere into the upper portion of the reactor, partially oxidising the feedstock with oxygen in the upper portion of the reactor, and contacting a part of the partially oxidized feedstock with the reforming catalyst in the reactor upper portion.

6 Claims, No Drawings

PROCESS AND REACTOR FOR THE PREPARATION OF HYDROGEN AND CARBON MONOXIDE RICH GAS

This is a continuation of U.S. application Ser. No. 09/752,728, filed Jan. 3, 2001, now abandoned, the entire disclosure of which is hereby incorporated by reference, and claims the benefit of U.S. Provisional Application No. 60/175,427, filed Jan. 11, 2000.

BACKGROUND OF THE INVENTION

1. Field of the Invention

The present invention is directed to the preparation of hydrogen and carbon monoxide rich gas. In particular, the invention relates to a process and reactor for the preparation of such gas by autothermal catalytic reforming of a hydrocarbon feedstock.

2. Description of the Related Art

Hydrogen and carbon monoxide rich gases are mainly used as synthesis gas in the production of ammonia and methanol or other organic compounds.

The gases find further employment during steel production and as fuel or town gas.

Industrial preparation methods most usually comprise autothermal catalytic reforming and non-catalytic partial oxidation of hydrocarbons.

During partial oxidation a hydrocarbon feedstock is combusted together with air, oxygen, or oxygen-enriched air in a burner mounted at the top of a reaction vessel. Oxygen is, thereby, supplied in amounts, which are less than the amount required for complete combustion, and hydrogen and carbon monoxide are produced in an effluent gas mainly by flame ignition reactions:

$$C_nH_m + n/2 O_2 \Leftrightarrow n\, CO + m/2\, H_2 \quad (1)$$

$$C_nH_m + n\, O_2 \Leftrightarrow n\, CO_2 + m/2\, H_2O \quad (2)$$

Both reactions are strongly exothermic for all hydrocarbons.

Partial oxidation is typically employed in the gasification of heavy oils, where the temperature in the gas raises during the combustion to 1000–1500° C., which is high enough to give a sufficient low content of unconverted hydrocarbons in the combustion effluent gas. Lighter feedstocks ranging from natural gas to naphtha fractions with a boiling point up to 200° C. are conventionally treated by autothermal catalytic reforming of the feedstock.

During this process, only a part of the hydrocarbon feedstock is oxidized with an oxygen-containing atmosphere by the above flame reactions (1,2). Residual hydrocarbons in the gas stream from the combustion are then catalytic steam reformed by the endothermic reaction:

$$C_nH_m + n\, H_2O \Leftrightarrow n\, CO + (m/2+n)H_2 \quad (3)$$

Necessary heat for the endothermic steam reforming reaction is, thereby, provided by the exothermic flame reactions (1,2).

Somewhat lower combustion temperatures are used during autothermal catalytic reforming, which is operated at a typical temperature of about 900–1400° C. Steam is added to the feed in order to moderate the flame temperature and increase hydrocarbon conversion in the burner effluent gas.

Similar to the partial oxidation process, hydrocarbon feed mixed with steam is burnt with an oxygen containing atmosphere at the top of a reactor. Residual hydrocarbons in the combusted gas are then steam reformed in the presence of a catalyst arranged as fixed bed in a lower portion of the reactor. Heat for the endothermic steam reforming reactions is supplied by the hot effluent gas from the combustion zone in the upper reactor portion and above the catalyst bed. As the combustion gas contacts the catalyst, the temperature in the gas cools to 900–1100° C. by the steam reforming reactions in the catalyst bed.

In operating the above processes, suitable hydrocarbon feed, if necessary after preheating, is introduced into a burner mounted at the top of a reactor and burnt with oxygen containing atmosphere. In order to protect the reactor shell against the high temperatures arising during the exothermic oxidation reactions, industrial reactors are provided with a temperature resistant and insulating refractory lining on the inner wall of the reactor shell.

The lining materials must be able to withstand high temperature exposure and be suited to resistant erosion by hot gases. At present, refractory materials most commonly used in industrial reactors of the above types contain more than 90% alumina.

A general problem in the preparation of synthesis gas by the above processes is formation of soot in the combustion zone at critical process conditions, such as low steam/-carbon ratios in the feedstock to the processes.

A further problem is related to start-up of the burner for the partial oxidation of the feedstock, which requires preheating of the feedstock and the reactor to high temperatures.

SUMMARY OF THE INVENTION

It has now been found that the above problems in partial oxidation and autothermal catalytic reforming processes are substantially avoided when performing steam reforming reactions on the surface surrounding the combustion zone of hydrocarbon feedstock. Those reactions proceed in the combustion effluent gas when a suitable catalyst is arranged on the surface at least in the portion of the reactor, which surrounds the hot combustion zone.

A theoretical explanation for the reduced soot formation may be that precursor molecules participating in the formation of soot are reduced or reacted by steam reforming reactions proceeding on the catalysed surface adjacent to the combustion zone. An increased hydrogen concentration by the steam reforming process occurring in this region results furthermore in improved ignition property of the feed oxygen mixture and start-up of the process at less severe conditions.

Pursuant to the above finding, this invention provides a process for suppression of soot formation in the preparation of hydrogen and/or carbon monoxide rich gas by partial oxidation of a hydrocarbon feedstock, comprising the steps of in a reactor with an upper and a lower portion, arranging at least on surface of the reactor upper portion catalytic material being active in steam reforming of hydrocarbon;

introducing the feedstock and an oxygen-containing atmosphere into the upper portion of the reactor;

partially oxidising the feedstock with oxygen in the upper portion of the reactor; and contacting a part of the partially oxidised feedstock with the reforming catalyst in the reactor upper portion.

A reactor being useful in carrying out the process according to the invention comprises within a pressure shell a refractory lining on an inner wall of the shell, an upper portion adapted to receive a hydrocarbon feedstock and an oxygen-containing atmosphere, and to partially oxidise the feedstock with oxygen, and a reforming catalyst arranged in the upper portion of the reactor.

DETAILED DESCRIPTION OF THE PREFERRED EMBODIMENT

In operating a specific embodiment of the inventive process and reactor, a hydrocarbon feedstock preheated to about 400–700° C. is introduced into a burner mounted at the top of a refractory lined reactor. In the burner, the feedstock is mixed with steam and oxygen containing atmosphere in an amount providing a process gas with an oxygen/carbon mole ratio of preferably between 0.5 and 0.7 and a steam/carbon mole ratio of preferably between 0.5 and 1.5.

Typical hydrocarbon feedstock suited for the process will range from methane to naphtha fractions with a boiling point up to 200° C., including natural gas, LPG and primary reformed gas, when operating the process under autothermal catalytic reforming conditions. The process gas is discharged from the burner into a combustion zone in the upper reactor portion, where part of the hydrocarbons in the gas are reacted with oxygen to carbon oxides and hydrogen by flame ignition reactions (1) and (2) as mentioned herein before.

Depending on the desired composition of the final product gas, oxygen may be supplied from air or oxygen-enriched air as in the preparation of ammonia synthesis gas or from oxygen for the production of oxosyn-thesis gas and reducing gas, where nitrogen is unwanted in the product gas. During hydrocarbon oxidation the temperature in the combustion zone raises to 900–1500° C.

By the endothermic steam reforming reaction (3) proceeding in the gas on the surface adjacent to combustion zone, concentration of hydrogen in recirculated combustion gas is increased and content of soot precursor molecules decreased.

The actual increase of hydrogen concentration depends, thereby, on the amount of hydrocarbons and steam in the gas from the combustion zone and the activity and amount of reforming catalyst in the upper reactor portion.

Catalysts suited for this purpose comprise the well-known reforming catalysts of Group VIII in the Periodic Table, including nickel and/or cobalt, which for sufficient soot reduction and flame ignition improvements are loaded in an amount of between 1 $g/m^2$ and 0.1 $g/cm^2$ on the lining surface by conventional impregnation or coating techniques.

When the process takes place at autothermal catalytic reforming conditions, the effluent gas from the combustion zone is further passed through a fixed bed of conventional nickel and/or cobalt reforming catalyst arranged in the lower portion of the reactor. By passage through the catalyst bed, residual hydrocarbons in the gas are further steam reformed to hydrogen and carbon monoxide.

What is claimed is:

1. A process for suppressing soot formation in the preparation of a hydrogen and/or carbon monoxide rich gas by partial oxidation of a hydrocarbon feedstock, comprising the steps of in a reactor with an upper portion and a lower portion, arranging at least on a surface of the reactor upper portion a catalytic material being active in steam reforming hydrocarbons;

introducing the feedstock and an oxygen-containing atmosphere into the upper portion of the reactor;

partially oxidizing the feedstock with oxygen in the upper portion of the reactor; and reducing soot formation upon partially oxidizing the feedstock by contacting a part of the partially oxidized feedstock with the reforming catalyst in the reactor upper portion.

2. The process of claim 1, wherein the partially oxidized feedstock from the upper portion of the reactor is further contacted with a steam reforming catalyst arranged in the lower portion of the reactor.

3. The process of claim 1, wherein the hydrocarbon feedstock and the oxygen-containing atmosphere is mixed in a burner before introduction into the upper portion of the reactor.

4. A process for preparing a hydrogen and/or carbon monoxide rich gas by partial oxidation of a hydrocarbon feedstock, comprising the steps of in a reactor with an upper portion and a lower portion, arranging at least on a surface of the reactor upper portion a catalytic material being active in steam reforming hydrocarbons;

introducing the feedstock, steam and an oxygen-containing atmosphere into the upper portion of the reactor;

partially oxidizing the feedstock with oxygen in the upper portion of the reactor to yield at least hydrogen and carbon oxides; and increasing the concentration of hydrogen obtained upon partially oxidizing the feedstock by contacting a part of the partially oxidized feedstock with the reforming catalyst in the reactor upper portion.

5. The process of claim 4, wherein the hydrocarbon feedstock and the oxygen-containing atmosphere is mixed in a burner before introduction into the upper portion of the reactor.

6. The process of claim 4, wherein the partially oxidized feedstock from the upper portion of the reactor is further contacted with a steam reforming catalyst arranged in the lower portion of the reactor.

* * * * *